(12) United States Patent
Ahmed et al.

(10) Patent No.: US 11,925,178 B1
(45) Date of Patent: Mar. 12, 2024

(54) 2'-ALKYLOXY-6'-PHENYL[3,4'-BIPYRIDINE]-3'-CARBONITRILE AS AN INSECTICIDAL AGENT AGAINST *APHIS CRACCIVORA*

(71) Applicant: KING FAISAL UNIVERSITY, Al-Ahsa (SA)

(72) Inventors: Hany Mohamed Abd El-Lateef Ahmed, Al-Ahsa (SA); Mai Mostafa Khalaf Ali, Al-Ahsa (SA); Antar A. Abdelhamid, Al-Baha (EG); Amer A. Amer, Sohag (EG)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/375,929

(22) Filed: Oct. 2, 2023

(51) Int. Cl.
*A01N 43/40* (2006.01)
*A01P 7/04* (2006.01)

(52) U.S. Cl.
CPC ............... *A01N 43/40* (2013.01); *A01P 7/04* (2021.08)

(58) Field of Classification Search
CPC .................................. A01N 43/40; A01P 7/04
See application file for complete search history.

(56) References Cited

U.S. PATENT DOCUMENTS

2022/0096450 A1  3/2022  Jorns et al.

FOREIGN PATENT DOCUMENTS

WO   WO 2020/146636   *   6/2020

OTHER PUBLICATIONS

Naseri et al., "Synthesis and Application of [ZR-UIO-66-PDC-SO3H]CL MOFs to the Preparation of Dicyanomethylene Pyridines via Chemical and Electrochemical Methods", Scientific Reports, 11, Article No. 16817 (2021).
Mirjalili et al., "CU(OAC)2 as a Green Promoter for One-Pot Synthesis of 2-Amino-4,6- Diarylpyridine-3-Carbonitrile as Antibacterial Agents", Bulletin of the Chemical Society of Ethiopia, vol. 34 No. 1 (2020).
Bekhit et al., "Novel Milrinone Analogs of Pyridine-3-Carbonitrile Derivatives as Promising Cardiotonic Agents", European Journal of Medicinal Chemistry, vol. 40, Issue 12, Dec. 2005, pp. 1405-1413.

* cited by examiner

*Primary Examiner* — Valerie Rodriguez-Garcia
(74) *Attorney, Agent, or Firm* — Nath, Goldberg & Meyer; Richard C. Litman

(57) ABSTRACT

Certain 2'-alkyloxy-6'-phenyl[3,4'-bipyridine]-3'-carbonitrile compounds, their synthesis, and their use as an insecticidal agent.

10 Claims, 4 Drawing Sheets

2'-ALKYLOXY-6'-PHENYL[3,4'-BIPYRIDINE]-3'-CARBONITRILE AS AN INSECTICIDAL AGENT AGAINST *APHIS CRACCIVORA*

BACKGROUND

1. Field

The present disclosure relates to certain 2'-alkyloxy-6'-phenyl[3,4'-bipyridine]-3'-carbonitrile compounds, their synthesis, and their use as insecticidal agents.

2. Description of the Related Art

Approximately, 45% of the world's annual food production is lost due to pest infestation; therefore, effective pest management by using a wide range of pesticides is required to confront pests and to increase crop production. Due to the ability of insects to develop resistance to conventional pesticides, there is an ongoing need for the discovery and development of new insecticides. Due to the majority of difficulties caused by the use of pesticides and to lessen the impact of pesticide compounds, secure and unique selective organic components are required for development.

Pyridines exist widely in nature, such as vitamins, alkaloids, and coenzymes, and have different biological activities such as antimicrobial, anticancer, and antioxidant activities, and the like. On the other hand, the pyridine ring seems to be the main framework of many neonicotinoid insecticides. The high insecticidal activities associated with neonicotinoids have been demonstrated against many insects and homopteran pests, such as aphids, which are one of the most dangerous pests that attack crops, such as Cotton, Wheat, Bean, Maize, and others, causing huge damage to crops, and great economic loss, sucking plant sap and weakening the plants. This is not the only reason to control aphids, as aphids also transmit viruses to plants. Neonicotinoids have previously been successful in controlling different types of aphids on different crop types, yet new neonicotinoids are needed to further help in the protection of crops.

Thus, new insecticides and/or pesticides solving the aforementioned problems are desired.

SUMMARY

The present subject matter relates to the synthesis of certain novel heterocyclic compounds, namely 2'-Ethoxy-6'-phenyl[3,4'-bipyridine]-3'-carbonitrile (4) and 2'-Methoxy-6'-phenyl[3,4'-bipyridine]-3'-carbonitrile (5), which can be synthesized via a one-pot four-component reaction of acetophenone, 3-pyridinecarboxaldehyde, sodium ethoxide solution and malononitrile. The chemical structure of the synthesized product was confirmed by its spectral (IR, ¹H NMR, ¹³C NMR) and elemental analysis. The products 2'-Ethoxy-6'-phenyl[3,4'-bipyridine]-3'-carbonitrile (4) and 2'-Methoxy-6'-phenyl[3,4'-bipyridine]-3'-carbonitrile (5) each contain two pyridine rings that have a high biological effect against *Aphis craccivora*, making them effective insecticidal agents.

In an embodiment, the present subject matter relates to a 2'-alkyloxy-6'-phenyl[3,4'-bipyridine]-3'-carbonitrile compound having the formula I:

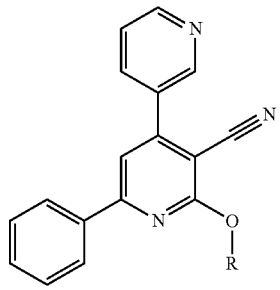

wherein R is methyl or ethyl.

In another embodiment, the present subject matter relates to an insecticidally acceptable composition comprising an insecticidally effective amount of the 2'-alkyloxy-6'-phenyl[3,4'-bipyridine]-3'-carbonitrile compound and an insecticidally acceptable carrier.

In a further embodiment, the present subject matter relates to a method of killing insects comprising applying to said insects or to a target site of insect infestation an insecticidally effective amount of the 2'-alkyloxy-6'-phenyl[3,4'-bipyridine]-3'-carbonitrile compound.

In an additional embodiment, the present subject matter relates to a method of repelling insects comprising applying to a target site of insect infestation an insect repelling effective amount of the 2'-alkyloxy-6'-phenyl[3,4'-bipyridine]-3'-carbonitrile compound.

In one more embodiment, the present subject matter relates to a method of controlling an insect pest comprising applying to a target site of insect infestation an insect controlling effective amount of the 2'-alkyloxy-6'-phenyl[3,4'-bipyridine]-3'-carbonitrile compound.

In a further embodiment, the present subject matter relates to a method of making the 2'-alkyloxy-6'-phenyl[3,4'-bipyridine]-3'-carbonitrile compound, the method comprising: adding a mixture of acetophenone and 3-pyridinecarboxaldehyde to a solution of a sodium alkoxide in an absolute alcohol with stirring to obtain a first reaction mixture; adding malononitrile to the first reaction mixture to obtain a second reaction mixture; irradiating the second reaction mixture followed by cooling to room temperature to obtain a crude product; purifying the crude product by filtering and recrystallization using the absolute alcohol; and obtaining the 2'-alkyloxy-6'-phenyl[3,4'-bipyridine]-3'-carbonitrile compound.

These and other features of the present subject matter will become readily apparent upon further review of the following specification.

DETAILED DESCRIPTION OF THE PREFERRED EMBODIMENTS

Figure 1:
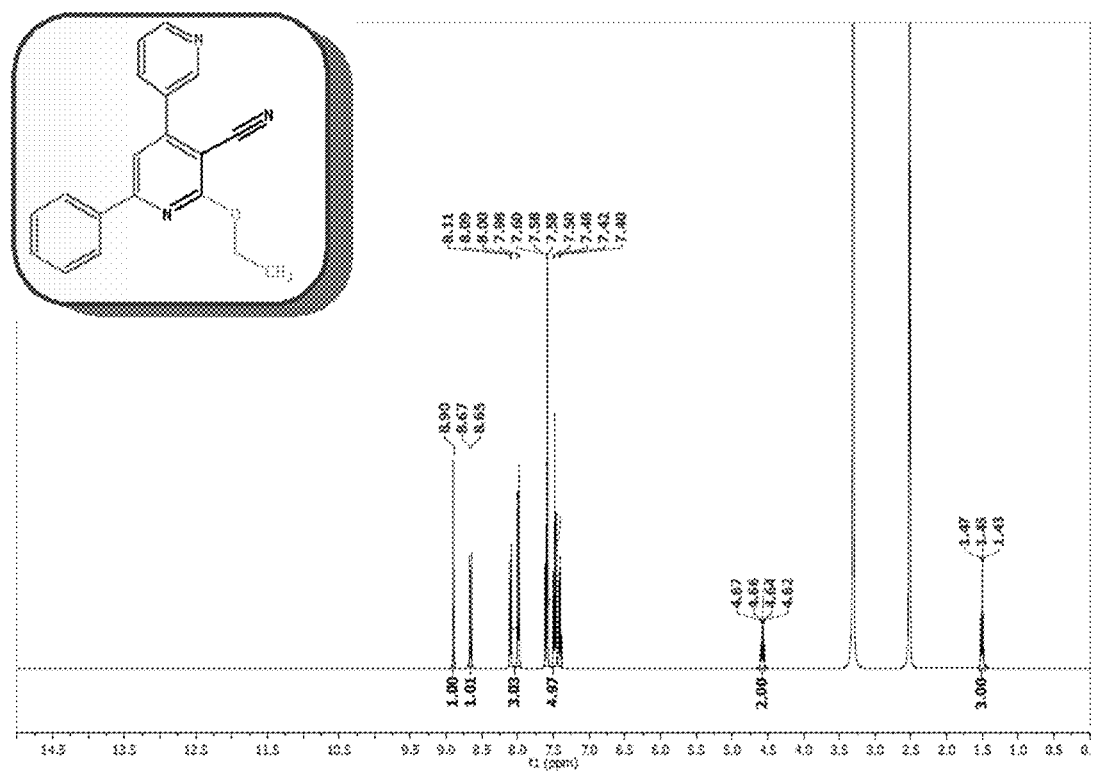
FIG. 1 shows a ¹H NMR analysis of the 2'-Ethoxy-6'-phenyl[3,4'-bipyridine]-3'-carbonitrile compound.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to the synthesis of certain novel heterocyclic compounds, namely 2'-Ethoxy-6'-phenyl[3,4'-bipyridine]-3'-carbonitrile (4) and 2'-Methoxy-6'-phenyl[3,4'-bipyridine]-3'-carbonitrile (5), which can be synthesized via a one-pot four-component reaction of acetophenone, 3-pyridinecarboxaldehyde, sodium ethoxide solution and malononitrile. The chemical structure of the synthesized product was confirmed by its spectral (IR, $^1$H NMR, $^{13}$C NMR) and elemental analysis. The products 2'-Ethoxy-6'-phenyl[3,4'-bipyridine]-3'-carbonitrile (4) and 2'-Methoxy-6'-phenyl[3,4'-bipyridine]-3'-carbonitrile (5) each contain two pyridine rings that have a high biological effect against *Aphis craccivora*, making them effective insecticidal agents.

In an embodiment, the present subject matter relates to a 2'-alkyloxy-6'-phenyl[3,4'-bipyridine]-3'-carbonitrile compound having the formula I:

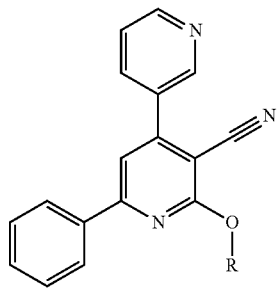

I wherein R is methyl or ethyl.

In certain embodiments, R can be methyl. In other embodiments, R can be ethyl.

In another embodiment, the present subject matter relates to an insecticidally acceptable composition comprising an insecticidally effective amount of the 2'-alkyloxy-6'-phenyl [3,4'-bipyridine]-3'-carbonitrile compound and an insecticidally acceptable carrier.

In some embodiments, the present compositions and methods of use can be used for combination treatment, where other insecticidal ingredients can be included therein, or can be co-administered therewith.

Non-limiting examples of suitable excipients, carriers, or vehicles useful herein include liquids such as water, saline, glycerol, polyethylene glycol, hyaluronic acid, ethanol, and the like. Suitable excipients for nonliquid formulations are also known to those of skill in the art.

The present compounds are typically administered at an insecticidally effective dosage, e.g., a dosage sufficient to provide a desired activity against insects.

The precise effective amount of insecticidal dosage levels will vary from treatment to treatment and will depend upon the target area of application, the insect species being treated for, the number of insects present, and the like. The treatment area may be administered as many doses as is required to produce an effective treatment.

Liquid compositions can, for example, be prepared by dissolving, dispersing, etc. the active compound as defined above and optional adjuvants in a carrier, such as, for example, water, saline, aqueous dextrose, glycerol, glycols, ethanol, and the like, to thereby form a solution or suspension. If desired, the composition to be administered may also contain minor amounts of nontoxic auxiliary substances such as wetting agents, emulsifying agents, or solubilizing agents, pH buffering agents and the like, for example, sodium acetate, sodium citrate, cyclodextrin derivatives, sorbitan monolaurate, triethanolamine acetate, triethanolamine oleate, etc.

In a further embodiment, the present subject matter relates to a method of killing insects comprising applying to said insects or to a target site of insect infestation an insecticidally effective amount of the 2'-alkyloxy-6'-phenyl[3,4'-bipyridine]-3'-carbonitrile compound.

In an embodiment, the present methods of killing insects can be effective against insects belonging to a species *Aphis craccivora*. Further, the present compounds can be used as an insecticide to control populations of other harmful insect pests, including, by way of non-limiting example, cockroaches and fleas. In certain embodiments, the present compounds can be applied for the protection of crops including but not limited to cotton, wheat, beans, maize, and the like.

In another embodiment, in the present methods of killing insects, the compound is 2'-Ethoxy-6'-phenyl[3,4'-bipyridine]-3'-carbonitrile and can have an $LC_{50}$ of about 0.0781 mg/L against nymphs of the species *Aphis craccivora* after 24 hours of treatment. In this regard, in the present methods of killing insects, the compound is 2'-Ethoxy-6'-phenyl[3,4'-bipyridine]-3'-carbonitrile and can have an $LC_{50}$ of about 1.302 mg/L against adults of the species *Aphis craccivora* after 24 hours of treatment.

Similarly, in the present methods of killing insects, the compound is 2'-Methoxy-6'-phenyl[3,4'-bipyridine]-3'-carbonitrile and can have an $LC_{50}$ of about 0.0842 mg/L against nymphs of the species *Aphis craccivora* after 24 hours of treatment. In this regard, in the present methods of killing insects, the compound is 2'-Methoxy-6'-phenyl[3,4'-bipyridine]-3'-carbonitrile and has an $LC_{50}$ of about 0.0842 mg/L against nymphs of the species *Aphis craccivora* after 24 hours of treatment.

In an additional embodiment of the present methods, the 2'-alkyloxy-6'-phenyl[3,4'-bipyridine]-3'-carbonitrile compound can be applied to the insects or to the target site.

In an additional embodiment, the present subject matter relates to a method of repelling insects comprising applying to a target site of insect infestation an insect repelling effective amount of the 2'-alkyloxy-6'-phenyl[3,4'-bipyridine]-3'-carbonitrile compound.

In an embodiment, the present methods of repelling insects can be effective against insects belonging to a species *Aphis craccivora*.

In one more embodiment, the present subject matter relates to a method of controlling an insect pest comprising applying to a target site of insect infestation an insect controlling effective amount of the 2'-alkyloxy-6'-phenyl[3,4'-bipyridine]-3'-carbonitrile compound.

In an embodiment, the present methods of controlling insect pests can be effective against insects belonging to a species *Aphis craccivora*.

In a further embodiment, the present subject matter relates to a method of making the 2'-alkyloxy-6'-phenyl[3,4'-bipyridine]-3'-carbonitrile compound, the method comprising: adding a mixture of acetophenone and 3-pyridinecarboxaldehyde to a solution of a sodium alkoxide in an absolute alcohol with stirring to obtain a first reaction mixture; adding malononitrile to the first reaction mixture to obtain a second reaction mixture; irradiating the second reaction mixture followed by cooling to room temperature to obtain a crude product; purifying the crude product by filtering and recrystallization using the absolute alcohol; and obtaining the 2'-alkyloxy-6'-phenyl[3,4'-bipyridine]-3'-carbonitrile compound.

The present production methods can be further seen by referring to the following Scheme 1:

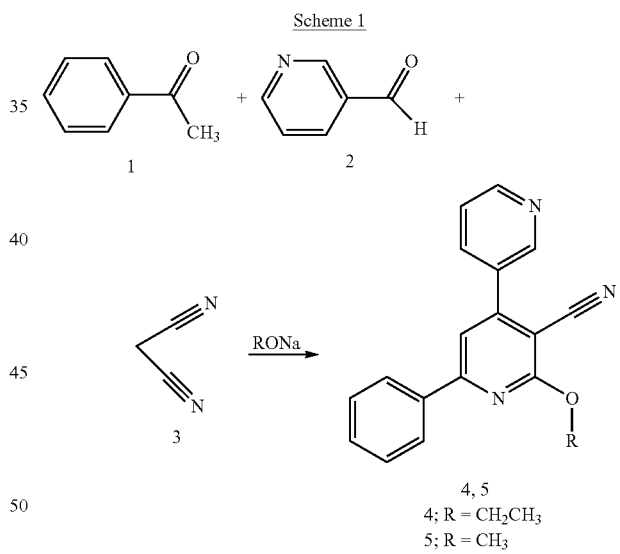

In an embodiment of the present production methods, the compound is 2'-Ethoxy-6'-phenyl[3,4'-bipyridine]-3'-carbonitrile, the sodium alkoxide is sodium ethoxide, and the absolute alcohol is absolute ethanol. In another embodiment of the present production methods, the compound is 2'-Methoxy-6'-phenyl[3,4'-bipyridine]-3'-carbonitrile, the sodium alkoxide is sodium methoxide, and the absolute alcohol is absolute methanol.

In certain embodiments of the present production methods, the first reaction mixture can be stirred for at least about 15 minutes.

In other embodiments of the present production methods, the irradiating step can be conducted in an MW oven and can last for about 2 to about 3 minutes.

In another embodiment of the present production methods, the compound is 2'-Ethoxy-6'-phenyl[3,4'-bipyridine]-3'-carbonitrile and can be obtained in a yield of about 81%. In a similar embodiment, the compound is 2'-Methoxy-6'-phenyl[3,4'-bipyridine]-3'-carbonitrile and can be obtained in a yield of about 87%.

In a further embodiment, the product of the present production methods can be obtained as crystals.

The following examples relate to various methods of manufacturing certain specific compounds and application results as described herein. All compound numbers expressed herein are with reference to the synthetic pathway figures shown above.

EXAMPLES

Example 1

Preparation of 2'-Ethoxy-6'-phenyl[3,4'-bipyridine]-3'-carbonitrile (4)

A mixture of acetophenone (0.24 g, 0.002) and 3-pyridinecarboxaldehyde (0.21 g, 0.002) was added to sodium ethoxide solution (0.20 g of sodium in 50 mL of absolute ethanol) and stirred for 15 min at room temperature, then malononitrile (0.13 g 0.002 mol) was added and the reaction mixture irradiated in an MW oven for 3 min, the reaction mixture was allowed to cool to room temperature and poured on 100 ml cold water. Then, the solid precipitate was collected by filtration, washing several times by water, dried, and recrystallized from ethanol.

Example 2

Preparation of 2'-Methoxy-6'-phenyl[3,4'-bipyridine]-3'-carbonitrile (5)

A mixture of acetophenone (0.24 g, 0.002) and 3-pyridinecarboxaldehyde (0.21 g, 0.002) was added to sodium methoxide solution (0.20 g of sodium in 50 mL of absolute methanol) and stirred for 15 min at room temperature, then malononitrile (0.13 g 0.002 mol) was added and the reaction mixture irradiated in an MW oven for 2 min, the reaction mixture was allowed to cool to room temperature and poured on 100 ml cold water. Then, the solid precipitate was collected by filtration, washing several times by water, dried, and recrystallized from methanol.

Figure 2:
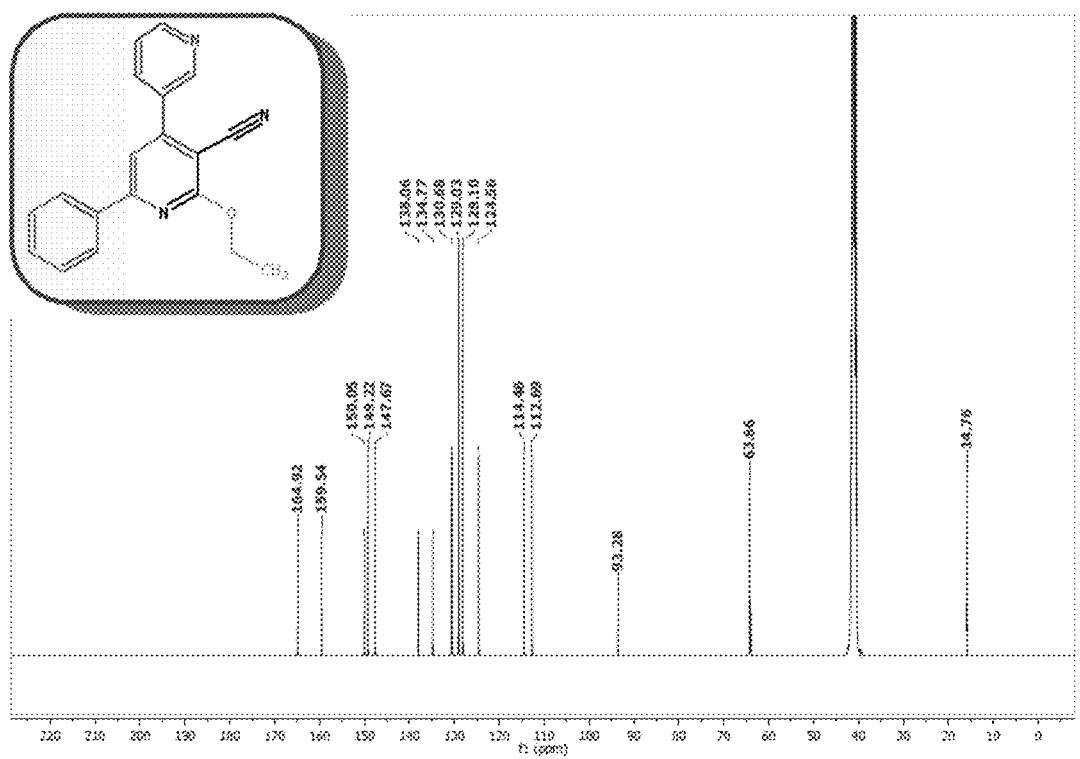
FIG. 2 shows a ¹³C NMR analysis of the 2'-Ethoxy-6'-phenyl[3,4'-bipyridine]-3'-carbonitrile compound.
Figure 3:
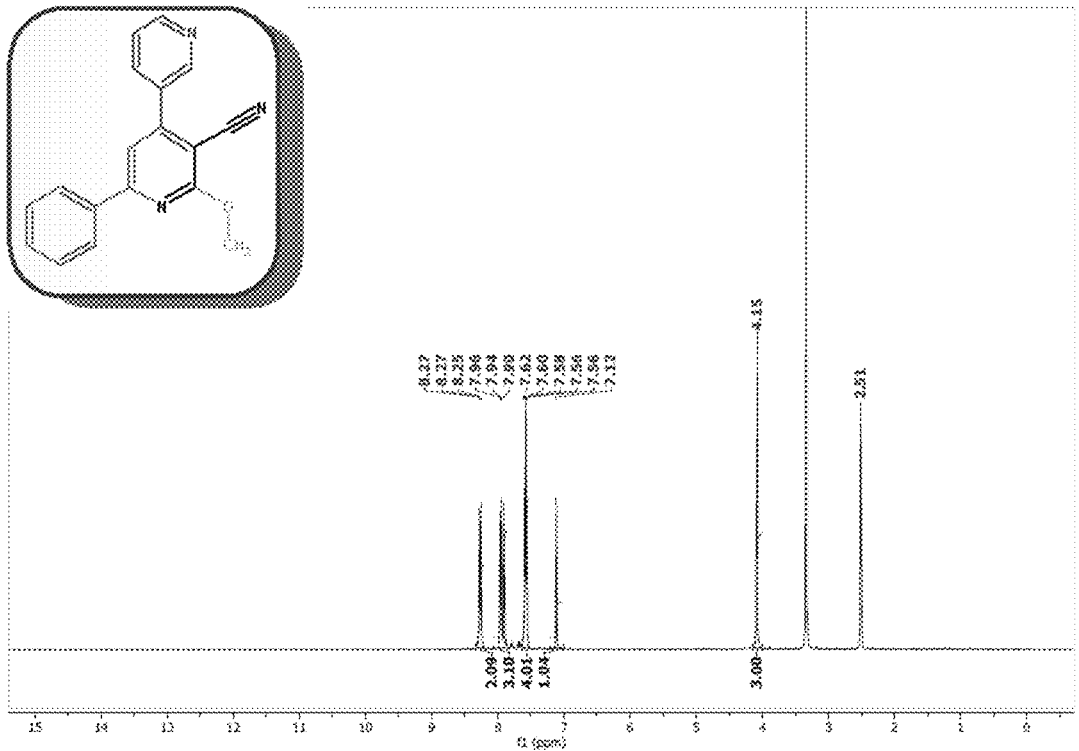
FIG. 3 shows a ¹H NMR analysis of the 2'-Methoxy-6'-phenyl[3,4'-bipyridine]-3'-carbonitrile compound.

Characterization of the prepared compounds using $^1$H NMR, and $^{13}$C NMR analysis is shown in FIGS. 1-3, respectively. The elemental analysis can be seen as follows.

Characterization data of 2'-Ethoxy-6'-phenyl[3,4'-bipyridine]-3'-carbonitrile (4)

Yield 81%; mp. 177-179° C.; IR: 2951, 2846 (CH-aliph), 2210 (CN); $^1$H NMR: δ 8.90 (s, 1H, CHarom), 8.66 (d, 1H, J=8 Hz, CHarom), 8.11-7.98 (m, 3H, CHarom), 7.60-7.40 (m, 5H, CHarom), 4.65 (q, 2H, J=7 Hz, CH$_2$), 1.45 (t, 3H, J=7 Hz, CH$_3$); $^{13}$C NMR: δ 164.92, 159.54, 150.04, 149.22. 147.67, 138.06, 134.77, 129.03, 128.10, 124.56, 114.46, 112.69, 93.28, 63.66, 14.76; Anal. Calcd. for C$_{19}$H$_{15}$N$_3$O (301.34): C, 75.73; H, 5.02; N, 13.94, Found: C, 76.07; H, 5.20; N, 13.89.

Characterization data of 2'-Methoxy-6'-phenyl[3,4'-bipyridine]-3'-carbonitrile (5)

Yield 87%; mp. 184-186° C.; IR: 2934, 2837 (CH-aliph), 2215 (CN); $^1$H NMR: δ 8.27-8.25 (m, 2H, CHarom), 7.96-7.90 (m, 3H, CHarom), 7.62-7.56 (m, 4H, CHarom), 7.12 (s, 1H, CHarom), 4.15 (s, 3H, CH$_3$); Anal. Calcd. for C$_{18}$H$_{13}$N$_3$O (287.32): C, 75.25; H, 4.56; N, 14.63, Found: C, 75.41; H, 4.60; N, 14.79.

Example 3

Insecticidal Bioassay Screening

Insect Collection and Rearing

The original batches of cowpea aphid insects were collected from pest's laboratory, Plant Protection Research Institute, Agricultural Research Center. The target compounds were screened for their insecticidal activity towards nymphs and adults of cowpea aphid.

Laboratory Bioassay

The insecticidal activities of compounds 4 and 5 were measured by using leaf dipping method under the same reported laboratory conditions. Five concentrations of compound 4, 5 and 0.1% Tween-80 as a surfactant were used. Nearly the same size 30 nymphs and 30 adults of cowpea aphid insects were used for dipping for 10 second in every concentration of each compound (repeat three times). Insects which tested were allowed to stand to dry at room temperature for about half an hour. In the control experiment, the insects were dunked in distilled water and 0.1% tween-80 only. These applications were carried out at 5% relative humidity, and at a temperature of 25° C. After the used insect had dried, they were transferred to glass jars containing water. With a new binocular microscope, the aphid mortality was taken after 24 hrs of treatment. Any aphid that was unable to move was considered dead. The $LC_{50}$ values used to evaluate the insecticidal activity were estimated by probit analysis.

Figure 4:
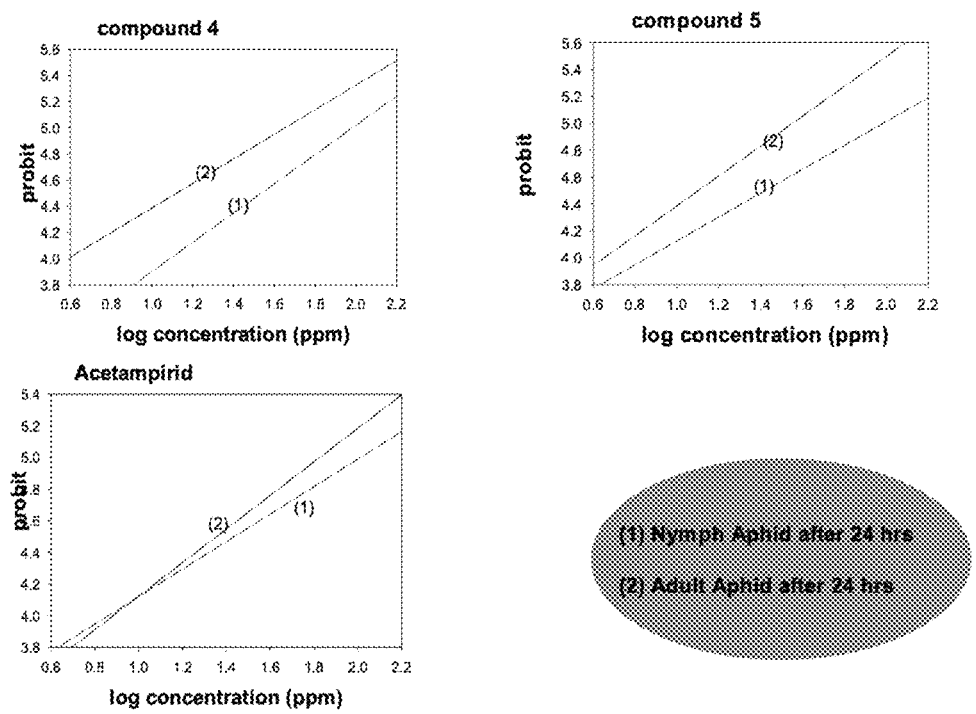
FIG. 4 shows a comparison of insecticidal activity of the present compounds and acetamiprid toward nymphs and adults of cowpea aphid after 24 hours of treatment.

The results of the bioassay screening can be observed in Table 1, below, and in FIG. 4.

TABLE 1

Insecticidal activity of compound 4, 5 and acetamiprid as an insecticide reference against nymphs and adults of cowpea aphid insects after 24 h of treatment.

| | Nymphs | | | Adults | | |
|---|---|---|---|---|---|---|
| Compound. | $LC_{50}$ (mg/L) | Slope | Toxic ratio | $LC_{50}$ (mg/L) | Slope | Toxic ratio |
| 4 | 0.0781 | 0.397 ± 0.265 | 0.576 | 1.302 | 0.461 ± 0.275 | 0.205 |
| 5 | 0.0842 | 0.322 ± 0.267 | 0.0534 | 1.399 | 0.492 ± 0.271 | 0.190 |
| Acetamiprid | 0.045 | 0.381 ± 0.283 | 1 | 0.267 | 0.387 ± 0.283 | 1 |

Notes:
Toxicity ratio is calculated as Acetamiprid's $LC_{50}$ value for baseline toxicity/the compound' $LC_{50}$ value.

The result showed that compounds 4 and 5 showed high toxicological activity with $LC_{50}$ value of 0.0781 and 0.0842 mg/L, respectively. Compounds 4, 5 revealed the high toxicity, which is close in activity to a reference insecticide, acetamiprid.

Further, the insecticidal activities of compounds 4 and 5 showed the high toxicological activity with $LC_{50}$ value of 1.302 and 1.399 mg/L, respectively.

It is to be understood that the 2'-alkyloxy-6'-phenyl[3,4'-bipyridine]-3'-carbonitrile compounds, compositions containing the same, and methods of using and producing the same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of killing insects comprising applying to said insects or to a target site of insect infestation an insecticidally effective amount of a 2'-alkyloxy-6'-phenyl[3,4'-bipyridine]-3'-carbonitrile compound of formula I:

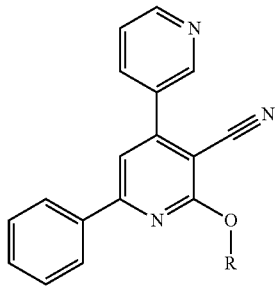

wherein R is methyl or ethyl.

2. The method of killing insects of claim 1, wherein the insects belong to a species *Aphis craccivora*.

3. The method of killing insects of claim 2, wherein the compound is 2'-ethoxy-6'-phenyl[3,4'-bipyridine]-3'-carbonitrile and has an $LC_{50}$ of about 0.0781 mg/L against nymphs of the species *Aphis craccivora* after 24 hours of treatment.

4. The method of killing insects of claim 2, wherein the compound is 2'-ethoxy-6'-phenyl[3,4'-bipyridine]-3'-carbonitrile and has an $LC_{50}$ of about 1.302 mg/L against adults of the species *Aphis craccivora* after 24 hours of treatment.

5. The method of killing insects of claim 2, wherein the compound is 2'-methoxy-6'-phenyl[3,4'-bipyridine]-3'-carbonitrile and has an $LC_{50}$ of about 0.0842 mg/L against nymphs of the species *Aphis craccivora* after 24 hours of treatment.

6. The method of killing insects of claim 2, wherein the compound is 2'-methoxy-6'-phenyl[3,4'-bipyridine]-3'-carbonitrile and has an $LC_{50}$ of about 1.399 mg/L against adults of the species *Aphis craccivora* after 24 hours of treatment.

7. A method of controlling an insect pest comprising applying to a target site of insect infestation an insect controlling effective amount of a 2'-alkyloxy-6'-phenyl[3,4'-bipyridine]-3'-carbonitrile compound of formula I:

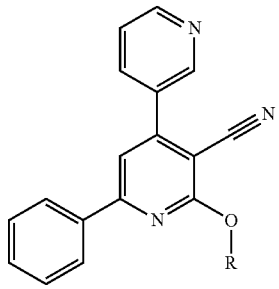

wherein R is methyl or ethyl.

8. The method of controlling the insect pest of claim 7, wherein the insect pest belongs to a species *Aphis craccivora*.

9. A method of repelling insects comprising applying to a target site of insect infestation an insect repelling effective amount of a 2'-alkyloxy-6'-phenyl[3,4'-bipyridine]-3'-carbonitrile compound of formula I:

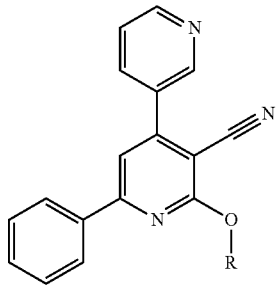

wherein R is methyl or ethyl.

10. The method of repelling insects of claim 9, wherein the insects belong to a species *Aphis craccivora*.

* * * * *